Sept. 22, 1959   D. C. KOHLER   2,905,273
BRAKE SYSTEM FOR TRACTOR TRAILERS
Filed Sept. 30, 1955
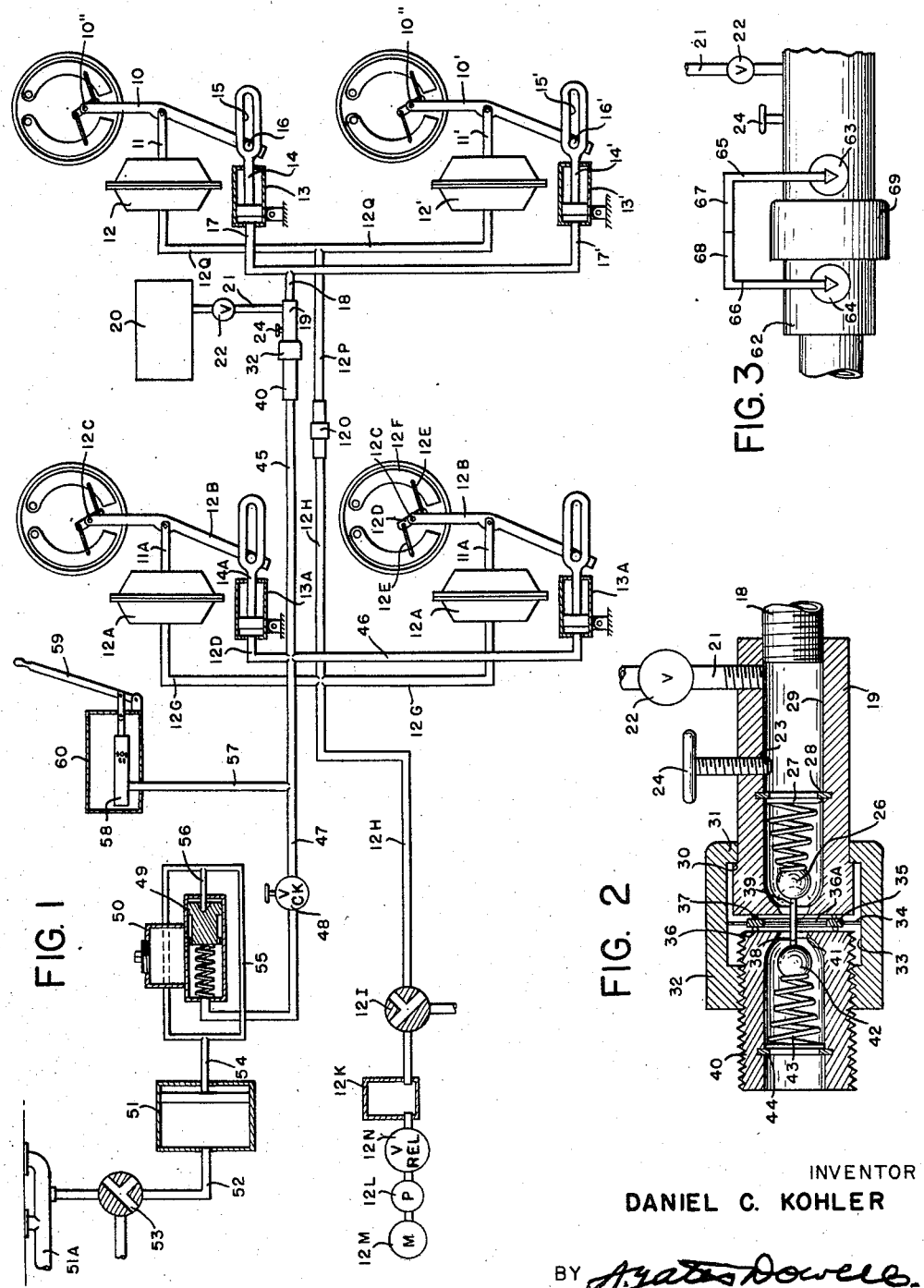
INVENTOR
DANIEL C. KOHLER
BY
ATTORNEY United States Patent Office 2,905,273
Patented Sept. 22, 1959

2,905,273

BRAKE SYSTEM FOR TRACTOR TRAILERS

Daniel C. Kohler, Wexford, Pa.

Application September 30, 1955, Serial No. 537,805

4 Claims. (Cl. 188—3)

The present invention relates to vehicle brakes and more particularly to auxiliary or emergency brakes for use with heavy vehicles and more particularly to a hydraulic brake system.

Heretofore the usual brake system for heavy tractor trailers has been air-operated brakes actuated through diaphragm-type motors from a source of high-pressure air. These brakes have been satisfactory as long as the high-pressure line or the diaphragms of the motors are free of leaks and a supply of compressed air is maintained. However, due to failures in the materials used or negligence on the part of the operators and mechanics leaks have occurred causing failure of the brakes all too frequently resulting in serious accidents.

An object of the present invention is to provide auxiliary or emergency brakes for use with self-propelled vehicles such as tractors and trailers used on the highways so that in the event of failure of conventional service brakes that the auxiliary or emergency brakes may be applied.

Another object of the invention is to provide a hand and/or power operated hydraulic brake system of general utility for application to an automotive vehicle.

Other and further objects will be apparent as the description proceeds and upon reference to the drawing wherein:

Figure 1 is a diagrammatic illustration of the brake system of the present invention showing the hydraulic cylinders for operating the brakes normally operated by air pressure;

Figure 2, an enlarged longitudinal section of one form of disconnectable coupling used for connecting the hydraulic system of the tractor to the trailer; and Figure 3, an elevation of another form of disconnectable coupling with manually or automatically operable valves.

Briefly the present invention includes emergency or auxiliary brakes particularly useful for combination tractor and trailer vehicles and includes in addition to the conventional service brakes of such tractor and trailer an additional set of hydraulically operated brakes with a hydraulic brake cylinder for each wheel with such cylinders connected by a lost-motion connection with the conventional operating lever of the service brake of the same wheel. Coupling means are provided for the hydraulic line between the tractor vehicle and trailer vehicle, which coupling means serves to automatically provide communication between such lines when the lines are coupled and serves to prevent loss of hydraulic fluid when the lines are uncoupled. Hydraulic pressure is provided to the line on the tractor by means of a vacuum motor which operates a master hydraulic cylinder on the tractor or by means of a hand-operated pump connected to a supply of hydraulic fluid on the tractor and both the master hydraulic cylinder and the pump may be connected to the line so that either may be used independently of the other or both may be used simultaneously. A supply of hydraulic fluid and suitable venting means are provided at the highest points in the system to assure proper venting of any trapped gas and also to provide a full system of hydraulic fluid free of gas.

Referring more particularly to the drawing, a conventional compressed air operating system for brakes of a truck include air motors 12A, 12A each having link 11A connected to brake shoe operating lever 12B which rotate shaft 12C which shaft rotates a two armed lever 12D connected by links 12E to the conventional brake shoe 12F whereby motion of the link 11A caused by the diaphragm motor 12A will expand brake shoes 12F to stop the truck.

Air is supplied to the diaphragm motors 12A, 12A by means of supply line 12G supplied from a main line 12H the air to which is controlled by a three-way valve 12I which is supplied with compressed air from a tank 12K. Compressed air is supplied to the tank 12A by a pump 12L driven from a motor 12M and excessive pressure is relieved by means of a relief valve 12N.

It will also be understood that the trailer which is towed by the tractor is provided with conventional brakes each of which is actuated by trailer brake operated shaft 10" and such brake operating shaft is connected to the brake shoe through a two armed lever and connecting links in substantially the same manner as the connection of the shaft 12C of the truck to the brake shoes 12F of the truck and similar parts are identified by the same reference characters. It will be seen that the air brakes on the truck and on the trailer are operated when three-way valve 12I conducts compressed air from tank 12K main supply line 12H. The supply line 12H being connected by means of a coupling 12O to a trailer supply line 12P which is connected to branch lines 12Q, 12Q which in turn are connected to diaphragm motors 12, 12' of the trailer and thereby the air brakes are applied to both the tractor truck and to the trailer by the controlled three-way valve 12I in a conventional manner.

Mounted on the trailer are hydraulic brake cylinders 13, 13' operating piston rods 14, 14' having elongated slots 15, 15' receiving pins 16, 16' so that levers 10, 10' may freely oscillate when the air motors are operated and so that the pistons of the hydraulic cylinders will not move under normal operation of the air brakes. However, the ends of such slots adjacent the hydraulic cylinders engage pins 16, 16' when the hydraulic cylinders 13 or 13' are actuated whereby the brakes may be applied by the actuation of such hydraulic cylinders. The levers 10, 10' may be made as single levers or extensions may be provided from the connection of links 11, 11' to the levers 10, 10' with such extensions having lost-motion connections with levers 10, 10'. Also if desired hydraulic cylinders could be located between the brake operating shafts 10" of levers 10, 10' and the connection of links 11, 11' so that piston rods 14, 14' directly abut levers 10, 10' without positive connection.

Branch hydraulic lines 17, 17' are connected to a first main line 18 (Figs. 1 and 2) having its free end connected to a tubular fitting 19 into which hydraulic fluid is supplied from a first supply tank 20 through a tube 21 removably connected to fitting 19 and having a hand operated shutoff valve 22 for controlling the supply of hydraulic fluid to the line 18 when necessary, such valve being normally closed during operation of the vehicle, the tube 21 being threaded or otherwise removably secured to the fitting 19. The fitting 19 is preferably located at the highest point in the line and is provided with a vent 23 closed by a screw type plug or the like 24 for bleeding the gas out of the line as any such gas normally collects at the highest point in the line. The fitting 19 is provided with a valve seat 25 (Fig. 2) for cooperation with a check valve 26 of the ball type, for example, said valve being biased by a spring 27 reacting against an abutment 28 to move the valve 26 to the dotted line position (Fig. 2). Abutment 28 may be removable to simplify assembly, for example, such abutment 28 may take the form of a split ring or similar structure which may be retained in a groove on the inner periphery of a passage 29 in the fitting 19; the ball 26 being shown in full line in open position. The ball valve 26 is automatically closed when the coupling is separated, whereby hydraulic fluid will not be lost when the coupling is released and the trailer is disconnected from the tractor.

The fitting 19 is provided with an annular shoulder 30 cooperating with an annular flange 31 of an internally threaded sleeve 32 having a groove 33 around the inner periphery thereof receiving radially extending fingers 34 projecting from a ring 35, said ring having gaskets 36, 37 on opposite surfaces thereof. Radial spokes 36A projecting inwardly from the ring 35 forming an open spider having outwardly projecting ball engaging pin portions 38, 39, pin portion 39 serving to retain ball 26 in the full line position shown when the coupling is connected so as to provide communication from the fitting 19 of the first line 18 to an externally threaded fitting 40 having a valve seat 41 against which a ball 42 is urged by a spring 43 reacting against a shoulder 44 which may be a split ring similar to ring 28, the ball 42 being held in full line position by pin portion 38 when the sleeve 32 holds the fittings in coupled position to maintain communication between fitting 29 and fitting 40.

The fitting 40 is connected to a second line 45 having a branch 46 adapted to communicate with hydraulic cylinders on the tractor to operate the brakes thereof. Another branch line 47 with a check valve 48 permits flow in the direction indicated by the arrow and the check valve may be manually released by a foot or hand lever or the like to permit flow of liquid in the opposite direction, the branch extension line 47 being connected by a further extension to a master hydraulic cylinder 49 having the usual supply reservoir 50. The master cylinder 49 is operated by a vacuum cylinder 51 connected to a source of vacuum such as the manifold 51A of an engine by means of a vacuum line 52 controlled by a hand or manually operated valve 53, the vacuum cylinder 51 operating its piston and piston rod 54. The piston rod 54 is connected to a yoke 55 embracing the master cylinder 49 which is connected to a piston rod 56 extending to the piston of the master cylinder so that when a vacuum is produced in the vacuum cylinder 51 the piston rod 54 is drawn to the left as shown in the drawing to actuate hydraulic master cylinder 49 causing flow of liquid under pressure therefrom through the check valve 48, branch line 47, second main line 45, and through the fittings 40 and 19 of the coupling to the first main line 18 and to the cylinders and pistons which operate the brakes of the trailer. Also hydraulic pressure is carried through branch line 46 to the hydraulic brake cylinders 13A and 13A which operate the brakes of the tractor.

Hydraulic pressure may also be applied from an alternative source of pressure to the second line 45 through a branch line 57 extending to a pump 58 operable by a hand lever 59 through suitable linkages, hydraulic fluid being supplied from a supply tank 60 to the cylinder 58 of the pump, the handle 59 being adapted to be actuated a number of times to move the necessary quantity of hydraulic liquid to operate the brakes. A manually releasable check valve (not shown) similar to check valve 48 may be provided in the line 57 to permit one-way flow from the cylinder 58 to the second main line 45 or the conventional valves of the hydraulic pump 58 may serve the same function of preventing reverse flow unless the handle 59 is in position to release the valves to permit hydraulic liquid to be drained from the branch line 57 into the reservoir 60. The reservoirs 50, 60 and 20 are preferably at the same height to prevent loss of liquid.

In the event of failure of the conventional air brakes, the vehicle driver may open the valve 53 to operate the vacuum cylinder 51 to actuate master cylinder 49 thereby applying the hydraulic brakes by the vacuum provided in the manifold 51A of the engine driving the vehicle. In the event that sufficient pressure is not exerted by the vacuum, the hand pump 58 may be operated by the handle 59, the check valve 48 preventing reverse flow of the liquid into the master cylinder 49 and an additional quantity of hydraulic liquid being pumped to the tractor brakes through branch 46 and to the trailer brakes through second main line 45 and through the coupling formed by fittings 40, 19 and sleeve 32 and first main line 18 and branch lines 17, 17' to the hydraulic brake cylinders 13 and 13'.

Another form of hydraulic coupling or union between the tractor and trailer is shown in Fig. 3 in which one fitting 61 is connected to the first line 18 and a second fitting 62 is connected to the second main line 45, such fittings being provided with positive operating valves 63, 64, respectively, which are actuated by levers. These valve levers 65 and 66 may be operated manually and/or such levers may have extensions 67, 68, respectively, which extensions engage one another when the fittings are secured together by the usual sleeve 69 thereby maintaining the valves 64 and 63 in open position. Preferably suitable spring means are provided for closing the valves 63 and 64 when the fittings are separated after the uncoupling operation. The fitting 61 is provided with a vent having a plug 24 and is also provided with a supply line 21 having a valve 22 and a supply of hydraulic fluid in a tank 20.

It will be obvious to those skilled in the art that various changes may be made in the invention without departing from the spirit and the scope thereof and therefore the invention is not limited by that which is shown in the drawings and described in the specification but only as indicated in the appended claims.

What is claimed is:

1. The combination with a vehicle having conventional brake shoes for stopping the wheels thereof, a hydraulic brake cylinder operatively connected to each brake shoe for applying a braking action between each brake shoe and its associated wheel, a hydraulic fluid supply line extending from said brake cylinders, a supply tank, a manually operable positive hydraulic pump in communication with said supply tank and said supply line, a check valve, an extension of said supply line providing communication between the outlet of said check valve and said supply line for substantially unimpeded flow of hydraulic fluid to said supply line, a master hydraulic cylinder, a further extension of said supply line extending from the inlet side of said check valve to the pressure side of said master cylinder whereby actuation of said master cylinder will cause the flow of hydraulic fluid from said master cylinder through said further extension, through said check valve, through said supply extension and through said supply line to said brake cylinders, a vacuum cylinder operatively connected to said master cylinder for applying an initial displacement of hydraulic fluid from said master cylinder to initially apply the brake shoes to said wheels, said positive hand operated pump serving to add additional pressure to said supply line and thereby increase the braking action, and means to release the check valve to permit reverse flow of hydraulic fluid to release the brakes.

2. The invention according to claim 1 in which other means are provided for operating the brake shoes from a different source of power and lost motion connection is provided between each brake shoe and its associated hydraulic brake cylinder so that said different source of power can be used to operate said brakes without affecting said brake cylinders.

3. The invention according to claim 1 in which the vacuum cylinder is connected by a vacuum line conduit to the manifold of an internal combustion engine and a valve is provided in said vacuum line conduit.

4. The combination with a tractor vehicle and a trailer vehicle having conventional brake shoes for stopping the wheels thereof, a hydraulic brake cylinder operatively connected to each brake shoe for applying a braking action between each brake shoe and its associated wheel, a first hydraulic fluid supply line extending from said brake hydraulic cylinders of the tractor vehicle, a supply tank on said tractor vehicle, a manually operable positive hydraulic pump in communication with said supply tank and said first supply line, a check valve, an extension of said first supply line providing communication between the outlet of said check valve and said first supply line for substantially unimpeded flow of hydraulic fluid to said first supply line, a master hydraulic cylinder, a further extension of said supply line extending from the inlet side of said check valve to the pressure side of said master cylinder whereby actuation of said master cylinder will cause the flow of hydraulic fluid from said master cylinder through said further extension, through said check valve, through said supply extension and said first supply line to said brake cylinders, a vacuum cylinder connected to said master cylinder for applying an initial displacement of hydraulic fluid from said master cylinder to initially apply the brake shoes to said wheels, said positive hand operated pump serving to add additional pressure to said first supply line and thereby increase the braking action, and means to release the check valve to permit reverse flow of hydraulic fluid to release the brakes, said trailer vehicle having a second hydraulic supply line and means to detachably connect said first hydraulic supply line to said second hydraulic supply line.

References Cited in the file of this patent

UNITED STATES PATENTS

| | | |
|---|---|---|
| 109,695 | Westinghouse | Nov. 29, 1870 |
| 675,100 | McDougall et al. | May 28, 1901 |
| 1,614,653 | Christensen | Jan. 18, 1927 |
| 2,065,017 | Oliver | Dec. 22, 1936 |
| 2,120,677 | Oliver | June 14, 1938 |
| 2,336,342 | Brewer | Dec. 7, 1943 |
| 2,675,099 | Troy | Apr. 13, 1954 |
| 2,759,568 | Fawick | Aug. 21, 1956 |